US012096399B2

(12) United States Patent
Zhao

(10) Patent No.: US 12,096,399 B2
(45) Date of Patent: Sep. 17, 2024

(54) INFORMATION SENDING METHOD AND RECEIVING METHOD, INFORMATION SENDING APPARATUS AND RECEIVING APPARATUS, AND STORAGE MEDIUM

(71) Applicant: BEIJING XIAOMI MOBILE SOFTWARE CO., LTD., Beijing (CN)

(72) Inventor: Qun Zhao, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 657 days.

(21) Appl. No.: 17/292,430

(22) PCT Filed: Nov. 8, 2018

(86) PCT No.: PCT/CN2018/114628
§ 371 (c)(1),
(2) Date: May 8, 2021

(87) PCT Pub. No.: WO2020/093326
PCT Pub. Date: May 14, 2020

(65) Prior Publication Data
US 2022/0022166 A1 Jan. 20, 2022

(51) Int. Cl.
*H04W 72/02* (2009.01)
*H04L 1/00* (2006.01)
(Continued)

(52) U.S. Cl.
CPC ........... *H04W 72/02* (2013.01); *H04L 1/0038* (2013.01); *H04W 72/0446* (2013.01);
(Continued)

(58) Field of Classification Search
CPC .................................................. H04W 72/02
See application file for complete search history.

(56) References Cited

U.S. PATENT DOCUMENTS

2017/0094657 A1 3/2017 Yoon
2020/0029340 A1* 1/2020 He ..................... H04W 72/25
2022/0353846 A1* 11/2022 Wang ................ H04W 72/0446

FOREIGN PATENT DOCUMENTS

CN 104796986 A 7/2015
CN 106374985 A 2/2017
(Continued)

OTHER PUBLICATIONS

CN First Office Action in Application No. 201880001951.7, mailed on Dec. 1, 2020.
(Continued)

*Primary Examiner* — Abdeltif Ajid
(74) *Attorney, Agent, or Firm* — Syncoda LLC; Feng Ma

(57) ABSTRACT

An information sending method includes: a sending device determining a first frequency-domain bandwidth occupied by control information to be sent, and a second frequency-domain bandwidth occupied by user data corresponding to said control information; the sending device occupying m different frequency-domain resources in a frequency-division multiplexing manner to repeatedly transmit the control information m times to a receiving device; and the sending device occupying target frequency-domain resources to send the user data to the receiving device. In the technical solution provided by the present disclosure, a sending device occupies a plurality of different frequency-domain resources and repeatedly transmits control information to a receiving device in the frequency-division multiplexing manner; thus, the probability that the control information is detected is correspondingly improved.

20 Claims, 9 Drawing Sheets

(51) Int. Cl.
*H04W 72/0446* (2023.01)
*H04W 72/0453* (2023.01)
*H04W 72/20* (2023.01)
*H04W 76/14* (2018.01)

(52) U.S. Cl.
CPC ....... *H04W 72/0453* (2013.01); *H04W 72/20* (2023.01); *H04W 76/14* (2018.02)

(56) References Cited

FOREIGN PATENT DOCUMENTS

| CN | 106470483 A | 3/2017 |
| CN | 106470499 A | 3/2017 |
| CN | 107612666 A | 1/2018 |
| CN | 107733496 A | 2/2018 |
| CN | 107733591 A | 2/2018 |
| CN | 108024286 A | 5/2018 |
| WO | 2015018617 A1 | 2/2015 |
| WO | 2017052458 A1 | 3/2017 |

OTHER PUBLICATIONS

CN Notice Of Allowance in Application No. 201880001951.7, mailed on Mar. 29, 2021.
International Search Report in Application No. PCT/CN2018/114628, mailed on Jul. 3, 2019.
Extended European Search Report in Application No. 18939764.9, mailed on May 27, 2022.

\* cited by examiner

INFORMATION SENDING METHOD AND RECEIVING METHOD, INFORMATION SENDING APPARATUS AND RECEIVING APPARATUS, AND STORAGE MEDIUM

CROSS-REFERENCE TO RELATED APPLICATIONS

This application is a national stage of International Application No. PCT/CN2018/114628 filed on Nov. 8, 2018, the disclosure of which is hereby incorporated by reference in its entirety.

TECHNICAL FIELD

Embodiments of the present disclosure relate to communication technologies, and more particularly, to an information sending method and receiving method, an information sending apparatus and receiving apparatus and a storage medium in a direct-connection communication scenario.

BACKGROUND

In Vehicle to Everything (V2X) technologies, communication between in-vehicle devices and other devices (e.g. other in-vehicle devices, roadside infrastructure, etc.) can be carried out via a direct-connection link (sidelink). For the direct-connection communication scenario in V2X technologies, higher communication rate, shorter communication latency and more reliable communication quality are required to meet more business requirements.

For the direct-connection communication scenario in the V2X technologies, how a sending device sends control information and user data to a receiving device is a problem to be studied and solved. Before sending the user data to the receiving device, the sending device needs to send necessary information required for the reception of the user data to the receiving device through the control information. The receiving device generally detects by blind detection and correctly receives the control information, and then correctly receives and demodulates the user data according to the contents contained in the control information. If Time Division Multiplexing (TDM) is used to transmit the control information and the corresponding user data, processing delay and cache consumption of the receiving device can be reduced.

In relevant technology, it is proposed that the frequency-domain resources occupied for the transmission of the control information are the same as those occupied for the transmission of the user data. That is, the frequency-domain bandwidth occupied by the control information is the same as the frequency-domain bandwidth occupied by its corresponding user data; and the frequency-domain location occupied by the control information is the same as the frequency-domain location occupied by its corresponding user data.

Since the frequency-domain resources occupied by the user data are dynamically determined according to the size of the user data, the choice of modulation coding methods, etc., if the control information and the user data use the same frequency-domain resources, the receiving device needs to perform blind detection at all of the frequency-domain locations that are possibly occupied by the control information, which will lead to a high complexity of blind detection of the control information by the receiving device.

SUMMARY

Embodiments of the present disclosure provide an information sending method, receiving method, apparatus and a storage medium in a direct-connection communication scenario. The technical solutions are as follows.

According to a first aspect of embodiments of the present disclosure, there is provided a method for sending information in a direct-connection communication scenario, including:

determining, by a sending device, a first frequency-domain bandwidth occupied by control information to be sent and a second frequency-domain bandwidth occupied by user data corresponding to the control information, wherein the second frequency-domain bandwidth is n times of the first frequency-domain bandwidth, and n is an integer greater than 1;

occupying, by the sending device, a number of m of different frequency-domain resources in a frequency-division multiplexing manner to repeatedly transmit the control information to a receiving device m times, wherein a frequency-domain bandwidth of each of the m different frequency-domain resources is the first frequency-domain bandwidth, and m is an integer less than or equal to n, and greater than 1; and occupying, by the sending device, a target frequency-domain resource to send the user data to the receiving device, wherein a frequency-domain bandwidth of the target frequency-domain resource is the second frequency-domain bandwidth, and the target frequency-domain resource includes the m different frequency-domain resources.

Optionally, m is equal to n, the m different frequency-domain resources do not overlap each other in terms of frequency-domain location, and a sum total of the frequency-domain bandwidths occupied by the m different frequency-domain resources is equal to the second frequency-domain bandwidth.

Optionally, determining, by the sending device, the first frequency-domain bandwidth occupied by the control information to be sent and the second frequency-domain bandwidth occupied by the user data corresponding to the control information, includes:

determining, by the sending device, the first frequency-domain bandwidth occupied by the control information to be sent;

determining, by the sending device, a number of resource elements (REs) that needs to be occupied by the user data, according to data amount and a modulation coding method of the user data corresponding to the control information; and determining, by the sending device, the second frequency-domain bandwidth occupied by the user data, according to the number of REs that needs to be occupied by the user data and the first frequency-domain bandwidth, wherein n is a minimum multiple of the number of REs that needs to be occupied to contain the user data or a multiple closest to the number of REs that needs to be occupied by the user data.

Optionally, in the control information that is repeatedly transmitted m times, the control information uses different transmission powers at least two times.

Optionally, in the control information that is repeatedly transmitted m times, the control information uses different precoding matrices at least two times.

According to a second aspect of embodiments of the present disclosure, there is provided a method for receiving information in a direct-connection communication scenario, including:

determining, by a receiving device, a plurality of candidate frequency-domain locations at which a sending device sends control information, wherein the control information occupies a number of m of different frequency-domain resources in a frequency-division multiplexing manner for repetitive transmission, a frequency-domain bandwidth of each of the m different frequency-domain resources is a first frequency-domain bandwidth, and m is an integer greater than 1;

performing, by the receiving device, blind detection of the control information, according to the plurality of candidate frequency-domain locations; and receiving, after the control information is successfully received, by the receiving device, the user data on a target frequency-domain resource, according to the control information, wherein a frequency-domain bandwidth of the target frequency-domain resource is n times of the first frequency-domain bandwidth, the target frequency-domain resource includes the m frequency-domain resources, n is an integer greater than 1, and m is less than or equal to n.

Optionally, m is equal to n, the m different frequency-domain resources do not overlap each other in terms of frequency-domain location, and a sum total of the frequency-domain bandwidths occupied by the m different frequency-domain resources is equal to the second frequency-domain bandwidth.

Optionally, the method further includes:

determining, by the receiving device, the control information, which is repeatedly transmitted m times, according to information obtained during the blind detection; and performing, by the receiving device, merge detection and/or merge reception of the m times of control information.

Optionally, performing, by the receiving device, the blind detection of the control information, according to the plurality of candidate frequency-domain locations, includes:

performing, by the receiving device, the blind detection based on merge reception, on the control information that is repeatedly transmitted m times, according to the plurality of candidate frequency-domain locations.

According to a third aspect of the embodiments of the present disclosure, there is provided an apparatus for sending information in a direct-connection communication scenario, applied to a sending device, including:

a bandwidth determination module, configured to determine a first frequency-domain bandwidth occupied by control information to be sent and a second frequency-domain bandwidth occupied by user data corresponding to the control information, wherein the second frequency-domain bandwidth is n times of the first frequency-domain bandwidth, and n is an integer greater than 1;

a control information sending module, configured to occupy a number of m of different frequency-domain resources in a frequency-division multiplexing manner to repeatedly transmit the control information to a receiving device m times, wherein a frequency-domain bandwidth of each of the m different frequency-domain resources is the first frequency-domain bandwidth, and m is an integer less than or equal to n, and greater than 1; and a user data sending module, further configured to occupy a target frequency-domain resource to send the user data to the receiving device, wherein a frequency-domain bandwidth of the target frequency-domain resource is the second frequency-domain bandwidth, and the target frequency-domain resource includes the m different frequency-domain resources.

Optionally, m is equal to n, the m different frequency-domain resources do not overlap each other in terms of frequency-domain location, and a sum total of the frequency-domain bandwidths occupied by the m different frequency-domain resources is equal to the second frequency-domain bandwidth.

Optionally, the bandwidth determination module is configured to:

determine the first frequency-domain bandwidth occupied by the control information to be sent;

determine a number of resource elements (REs) that needs to be occupied by the user data, according to data amount and a modulation coding method of the user data corresponding to the control information; and determine the second frequency-domain bandwidth occupied by the user data according to the number of REs that needs to be occupied by the user data and the first frequency-domain bandwidth, wherein n is a minimum multiple of the number of REs that needs to be occupied to contain the user data or a multiple closest to the number of REs that needs to be occupied by the user data.

Optionally, in the control information that is repeatedly transmitted m times, the control information uses different transmission powers at least two times.

Optionally, in the control information that is repeatedly transmitted m times, the control information uses different precoding matrices at least two times.

According to a fourth aspect of the embodiments of the present disclosure, there is provided an apparatus for receiving information in a direct-connection communication scenario, applied to a receiving device, including:

a frequency-domain determination module, configured to determine a plurality of candidate frequency-domain locations at which a sending device sends control information, wherein the control information occupies a number of m of different frequency-domain resources in a frequency-division multiplexing manner for repetitive transmission, a frequency-domain bandwidth of each of the m different frequency-domain resources is a first frequency-domain bandwidth, and m is an integer greater than 1;

a control information detection module, configured to perform blind detection of the control information, according to the plurality of candidate frequency-domain locations; and a user data receiving module, configured to, after the control information is successfully received, receive the user data on a target frequency-domain resource, according to the control information a, wherein a frequency-domain bandwidth of the target frequency-domain resource is n times of the first frequency-domain bandwidth, the target frequency-domain resource includes the m frequency-domain resources, n is an integer greater than 1, and m is less than or equal to n.

Optionally, m is equal to n, the m different frequency-domain resources do not overlap each other in terms of frequency-domain location, and a sum total of the frequency-domain bandwidths occupied by the m different frequency-domain resources is equal to the second frequency-domain bandwidth.

Optionally, the apparatus further includes:
a retransmission determination module, configured to determine the control information, which is repeatedly transmitted m times, according to information obtained during the blind detection,
wherein the control information detection module is further configured to perform merge detection and/or merge reception of the m times of control information.

Optionally, the control information detection module is configured to perform, the blind detection based on merge reception, on the control information that is repeatedly transmitted m times, according to the plurality of candidate frequency-domain locations.

According to a fifth aspect of the embodiments of the present disclosure, there is provided an apparatus for sending information in a direct-connection communication scenario, applied to a sending device, including:
a processor;
a memory for storing instructions executable by the processor,
wherein the processor is configured to:
determine a first frequency-domain bandwidth occupied by control information to be sent and a second frequency-domain bandwidth occupied by user data corresponding to the control information, wherein the second frequency-domain bandwidth is n times of the first frequency-domain bandwidth, and n is an integer greater than 1;
occupy a number of m of different frequency-domain resources in a frequency-division multiplexing manner to repeatedly transmit the control information to a receiving device m times, wherein a frequency-domain bandwidth of each of the m different frequency-domain resources is the first frequency-domain bandwidth, and m is an integer less than or equal to n, and greater than 1; and
occupy a target frequency-domain resource to send the user data to the receiving device, wherein a frequency-domain bandwidth of the target frequency-domain resource is the second frequency-domain bandwidth, and the target frequency-domain resource includes the m different frequency-domain resources.

According to a sixth aspect of the embodiments of the present disclosure, there is provided an apparatus for receiving information in a direct-connection communication scenario, applied to a receiving device, including:
a processor;
a memory for storing instructions executable by the processor,
wherein the processor is configured to:
determine a plurality of candidate frequency-domain locations at which a sending device sends control information, wherein the control information occupies a number of m of different frequency-domain resources in a frequency-division multiplexing manner for repetitive transmission, a frequency-domain bandwidth of each of the m different frequency-domain resources is a first frequency-domain bandwidth, and m is an integer greater than 1;
perform blind detection of the control information, according to the plurality of candidate frequency-domain locations; and
receive, after the control information is successfully received, the user data on a target frequency-domain resource, according to the control information, wherein a frequency-domain bandwidth of the target frequency-domain resource is n times of the first frequency-domain bandwidth, the target frequency-domain resource includes the m frequency-domain resources, n is an integer greater than 1, and m is less than or equal to n.

According to a seventh aspect of the embodiments of the present disclosure, there is provided a non-transitory computer readable storage medium, having computer program stored thereon, wherein the computer program, when executed by a processor, implements the steps of the method in the first aspect, or implement the steps of the method in the second aspect.

The technical solutions provided by the embodiments of the present disclosure may include the following beneficial effects:

Compared with transmitting the control information only one time by the sending device, the sending device occupies a plurality of different frequency-domain resources to repeatedly transmit the control information to the receiving device a plurality of times in a frequency-division multiplexing manner, therefore, when the receiving device performs blind detection of the control information, the probability that the control information is detected is correspondingly increased, thereby reducing complexity of blind detection of the control information by the receiving device.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute part of this specification, illustrate embodiments consistent with the present disclosure and, together with the description, serve to explain the principles of the present disclosure.

DETAILED DESCRIPTION

Illustration will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the present disclosure as recited in the appended claims.

The network architecture and the business scenarios described in the embodiments of the present disclosure are intended to illustrate the technical solutions of the embodiments of the present disclosure more clearly, and are not restrictive of the technical solutions provided by the embodiments of the present disclosure. It is known to those of ordinary skill in the art that the technical solutions provided by the embodiments of the present disclosure are equally applicable to similar technical problems, along with that network architectures evolve and new business scenarios emerge.

Figure 1:
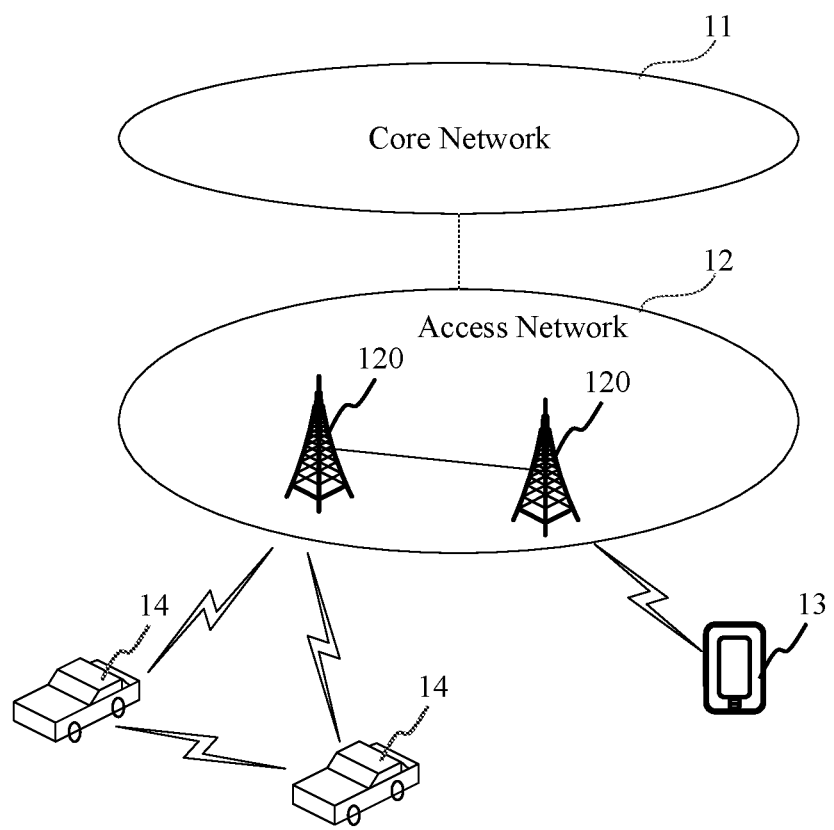
FIG. 1 is a schematic diagram illustrating a network architecture to which the embodiments of the present disclosure are applicable.

FIG. 1 is a schematic diagram illustrating a network architecture to which the embodiments of the present disclosure are applicable. The network architecture may be a network architecture for a C-V2X system, wherein C refers to cellular and the C-V2X system is a wireless communication system for a vehicle, which is formed on the basis of the evolution of a cellular network communication system such as 3G, 4G or 5G. The network architecture may include: a core network 11, an access network 12, a terminal 13 and a vehicle 14.

A number of core network devices are included in the core network 11. The function of the core network devices is mainly to provide user connection, management of users, and fulfill carrying of services to serve as an interface of a carrier network provided to an external network. For example, the core network of a Long Term Evolution (LTE) system may include Mobility Management Entity (MME), Serving Gateway (S-GW), PDN Gateway (P-GW), etc. The core network of a 5G NR system may include an Access and Mobility Management Function (AMF) entity, a User Plane Function (UPF) entity, a Session Management Function (SMF) entity, etc.

The access network 12 includes a number of access network devices 120. The access network devices 120 communicate with the core network devices 110 by certain air interface technology, for example, a S1 interface in LTE system, or a NG interface in 5G NR system. The access network devices 120 may be base stations (BS), which are devices deployed in the access network to provide wireless communication functions for terminals. The base station may include a variety of forms of macro base stations, micro base stations, relay stations, access points, etc. In systems adopting different wireless access technologies, devices with a base station function may have different names, for example, in LTE system, it is called eNodeB or eNB, and in 5G NR system, it is called gNodeB or gNB. The name "base station" may change along with that the communication technology evolves. For the convenience of description, in the embodiments of the present disclosure, the above-mentioned devices that provide the wireless communication functions for terminals are collectively called access network devices.

The terminal 13 may include various handheld devices, in-vehicle devices, wearable devices, computing devices, which have a wireless communication function, or other processing devices connected to a wireless modem, and various forms of User Equipment (UE), Mobile Stations (MS), terminal devices, and so on. For ease of description, the above-mentioned devices are collectively called terminal. The access network devices 120 and the terminal 13 communicate with each other by certain air interface technology, such as a Uu interface.

The vehicle 14 may be an autonomous vehicle or a non-autonomous vehicle. The vehicle 14 has an in-vehicle device through which the vehicle 14 communicates with other vehicles, the terminals 13 or other devices, for example a Road Side Unit (RSU). The in-vehicle device may be referred to as an in-vehicle terminal, an in-vehicle communication device or other names as well, without being limited by the embodiments of the present disclosure. The in-vehicle device may be a device integrated in a Telematics BOX (T-BOX), or may be a device separate from the body of the vehicle. In addition, the in-vehicle device may be assembled in the vehicle 14 before the vehicle 14 leaves the factory, or after the vehicle 14 leaves the factory.

The in-vehicle device of the vehicle 14 and other devices (such as other in-vehicle devices, the terminal 13, RSU, etc.) may communicate with each other through a direct communication interface (e.g. PC5 interface), and accordingly, a communication link established based on the direct communication interface can be called a sidelink. Furthermore, the in-vehicle device of the vehicle 14 and other devices can further be relayed through the access network 12 and the core network 11, that is, they communicate by using a communication link between the terminal 13 and the access network devices 120 in the original cellular network. Compared with Uu interface-based communication, direct communication interface-based communication has short latency and low overhead, and is suitable for communication between the in-vehicle device and other peripheral devices in close geographical proximity.

The above network architecture shown in FIG. 1 can realize V2X service scenarios, and the above-described network architecture can further include RSU, V2X application servers, V2X control function nodes, etc., which is not limited by the embodiments of the present disclosure. In addition, the technical solutions described in the embodiments of the present disclosure may be applicable to LTE system, or an evolution system subsequent to LTE system, for example, a LTE-Advanced (LTE-A) system or a 5G NR system.

In the embodiments of the present disclosure, for a direct communication scenario in the above-mentioned V2X service scenarios, there is provided a message sending method to reduce complexity of blind detection of control information by a receiving device.

In the embodiments of the present disclosure, the sending device and the receiving device are two side devices for direct-connection communication in the V2X service scenarios, the sending device and the receiving device can establish a direct-connection link therebetween through the direct-connection communication interface (e.g. PC5 interface), and then carry out interaction of user data and control information through the direct-connection link. For example, the sending device may be the in-vehicle device of the vehicle 14 in the network architecture shown in FIG. 1, and the receiving device may be an in-vehicle device of other vehicles, or may be the terminal 13 or the RSU, etc., as well. For another example, the sending device may be the terminal 13 in the network architecture shown in FIG. 1, and the receiving device may be other terminals, or may be the in-vehicle device of the vehicle 14, or the RSU, etc., as well. In some embodiments, for the same device (e.g. the same in-vehicle device or the same terminal), it may serve as the sending device in some scenarios while serve as the receiving device in other scenarios.

Before sending the user data to the receiving device, the sending device needs to send necessary information required for the reception of the user data to the receiving device by control information. The receiving device generally detects by the blind detection and correctly receives the control information, and then correctly receives and demodulates the user data according to the contents contained in the control information. In the embodiments of the present disclose, the control information corresponding to the user data refers to control information carrying the necessary information required for the reception of the user data, for example, the control information may include the location of a time-frequency resource block occupied by the user data, a modulation coding method of the user data, etc.

Hereinafter, the technical solutions of the present disclosure will be described and illustrated by several exemplary embodiments.

Figure 2:
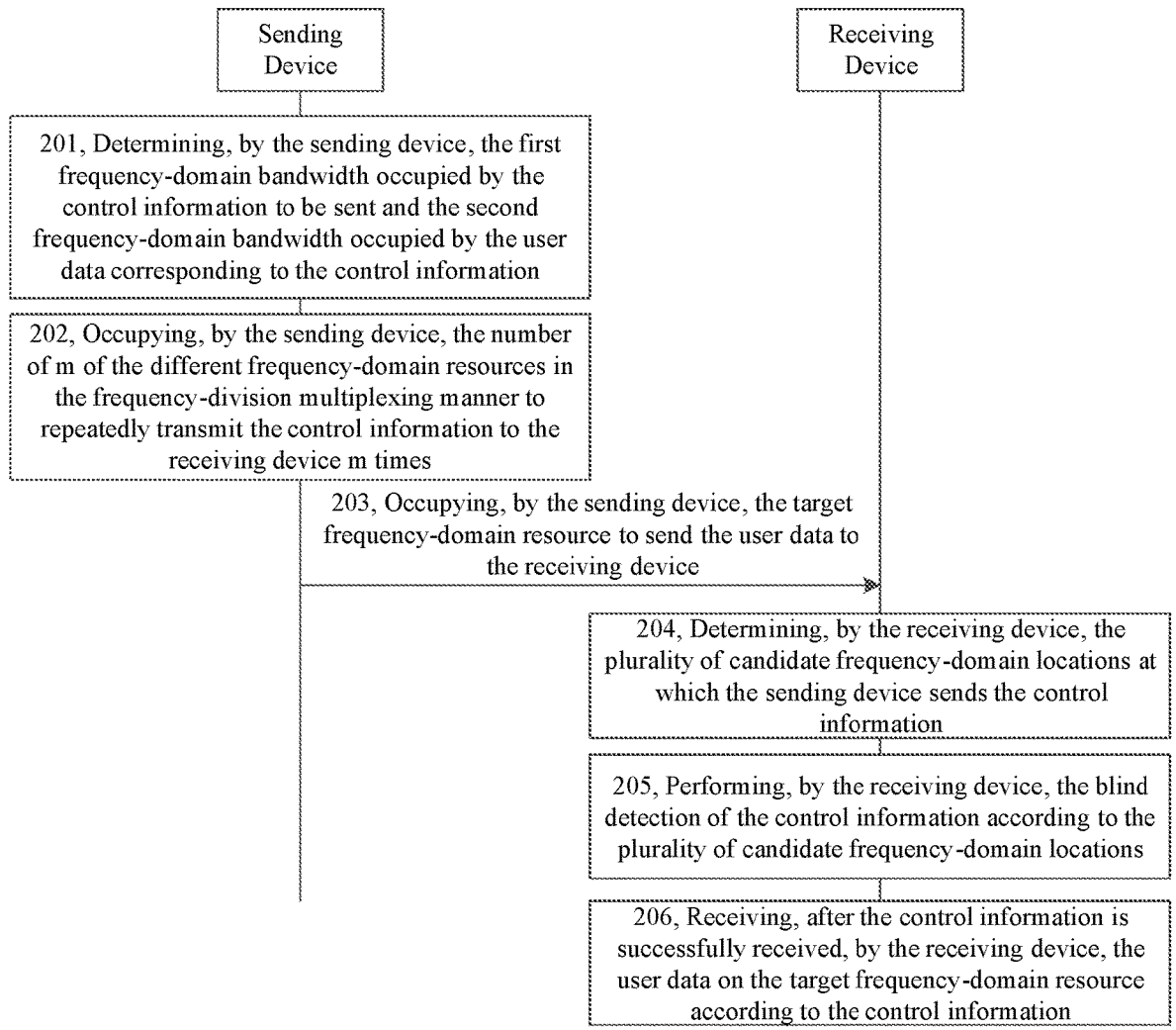
FIG. 2 is a flowchart showing a method for sending information in a direct-connection communication scenario according to an exemplary embodiment.

FIG. 2 is a flowchart showing a method for sending information in a direct-connection communication scenario according to an exemplary embodiment. The method can be applied to the network architecture shown in FIG. 1. The method may include several steps (201 to 206) as follows.

In step 201, a sending device determines a first frequency-domain bandwidth occupied by control information to be sent, and a second frequency-domain bandwidth occupied by user data corresponding to the control information.

The control information to be sent refers to control information that needs to be sent to the receiving device, but has not yet been sent. The control information carries necessary information required for the reception of the user data, for example, the location of a time-frequency resource block occupied by the user data, a modulation coding method of the user data, etc.

In the embodiments of the present disclosure, the second frequency-domain bandwidth is n times of the first frequency-domain bandwidth, wherein n is an integer greater than 1. For example, the second frequency-domain bandwidth may be 2 times, 3 times, or 4 times etc. of the first frequency-domain bandwidth.

Optionally, this step includes the following sub-steps (2011~2013).

In sub-step 2011, the sending device determines the first frequency-domain bandwidth occupied by the control information to be sent.

In the embodiments of the present disclosure, the first frequency-domain bandwidth occupied by the control information is a fixed value which is set in advance. The first frequency-domain bandwidth occupied by the control information may be set in advance based on the data amount of the control information (i.e., the number of bits of the control information). For example, the first frequency-domain bandwidth can be predefined by a protocol or configured for the sending device by the access network device through downlink signaling.

In sub-step 2012, the sending device determines the number of resource elements (RE) to be occupied by the user data according to the data amount and the modulation coding method of the user data corresponding to the control information.

Generally speaking, the more the data amount of the user data is, the greater the number of REs that the user data needs to occupy is. Certainly, the number of REs that needs to be occupied by the user data is further related to the modulation coding method.

In sub-step 2013, the sending device determines the second frequency-domain bandwidth occupied by the user data based on the number of REs that needs to be occupied by the user data and the first frequency-domain bandwidth.

As described above, the second frequency-domain bandwidth is n times of the first frequency-domain bandwidth. In one possible example, n is a minimum multiple of the number of REs that needs to be occupied to contain the user data. For example, supposing that the sending device determines that the first frequency-domain bandwidth occupied by the control information is BW1 and the number of REs that needs to be occupied by the user data is a, and assuming that the sum total of bandwidths occupied by the number of a of REs in frequency domain is BW0, and if there is a multiple n to make n×BW1≥BW0 and (n−1)×BW1<BW0, the sending device determines that the second frequency-domain bandwidth occupied by the user data is n×BW1. For example, the first frequency-domain bandwidth occupied by the control information is 2 PRBs, and the frequency-domain bandwidth that needs to be occupied by the user data, which is calculated on the basis of the number of REs that needs to be occupied by the user data, is 5 PRBs, then the sending device can select 3 times of the first frequency-domain bandwidth (i.e., 6 PRBs) as the second frequency-domain bandwidth occupied by the user data. For another example, the first frequency-domain bandwidth occupied by the control information is 2 PRBs, and the frequency-domain bandwidth that needs to be occupied by the user data, which is calculated on the basis of the number of REs that needs to be occupied by the user data, is 8 PRBs, the sending device can select 4 times of the first frequency-domain bandwidth (i.e., 8 PRBs) as the second frequency-domain bandwidth occupied by the user data.

In some possible cases, if the data amount of the user data is very small and the above minimum multiple of the number of REs that needs to be occupied to contain the user data is 1, the sending device may determine that the second frequency-domain bandwidth occupied by the user data is equal to the first frequency-domain bandwidth occupied by the control information. However, in most cases, the data amount of the user data is greater than the data amount of the control information, so that the second frequency-domain bandwidth occupied by the user data is at least twice as large as the first frequency-domain bandwidth occupied by the control information.

In another possible example, n is a multiple closest to the number of REs that needs to be occupied by the user data. For example, assuming that the sending device determines that the first frequency-domain bandwidth occupied by the control information is BW1 and the number of REs that needs to be occupied by the user data is a, and assuming that the sum total of bandwidths occupied by the number of a of REs in frequency domain is BW0, and if there is a multiple n to make an absolute value of a difference value between n×BW1 and BW0 less than or equal to an absolute value of a difference value between a product of BW1 and other multiples except n and BW0, the sending device determines that the second frequency-domain bandwidth occupied by the user data is n×BW1. For example, the first frequency-domain bandwidth occupied by the control information is 4 PRBs, and the frequency-domain bandwidth that needs to be occupied by the user data, which is calculated on the basis of the number of REs that needs to be occupied by the user data, is 8 PRBs, the sending device can select 2 times of the first frequency-domain bandwidth (i.e., 8 PRBs) as the second frequency-domain bandwidth occupied by the user data.

Furthermore, if there are two multiples closest to the number of REs that needs to be occupied by the user data, the sending device can select any one of the two multiples to multiply it with the first frequency-domain bandwidth, and determine the obtained product as the second frequency-domain bandwidth; or, the sending device can select the greater one of the two multiples and multiply it with the first frequency-domain bandwidth, and determine the obtained product as the second frequency-domain bandwidth as well. For example, if the first frequency-domain bandwidth occupied by the control information is 4 PRBs and the frequency-domain bandwidth that needs to be occupied by the user data, which is calculated based on the number of REs that needs to be occupied by the user data, is 10 PRBs, the sending device can choose 2 times of the first frequency-domain bandwidth (i.e., 8 PRBs) as the second frequency-domain bandwidth occupied by the user data, or choose 3 times of the first frequency-domain bandwidth (i.e., 12 PRBs) as the second frequency-domain bandwidth occupied by the user data.

Through the above manner, the sending device determines the second frequency-domain bandwidth occupied by the user data based on the number of REs that needs to be occupied by the user data and the first frequency-domain bandwidth, such that the finally determined second frequency-domain bandwidth is as close as possible to the number of REs that actually needs to be occupied by the user data, avoiding that the user data will not be transmitted in time due to that the second frequency-domain bandwidth is determined too small, or avoiding the waste of frequency-domain resources due to that the second frequency-domain bandwidth is determined too large, such that the finally determined second frequency-domain bandwidth will be more reasonable and accurate.

In step 202, the sending device occupies a number of m of different frequency-domain resources in a frequency-division multiplexing manner to repeatedly transmit the control information to the receiving device m times.

Figure 3:
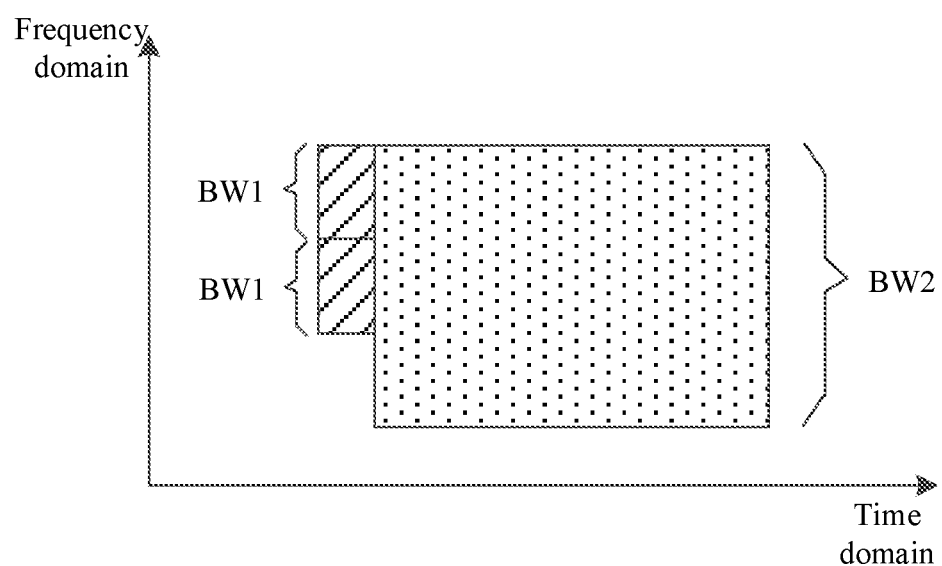
FIG. 3 is a first schematic diagram exemplarily illustrating a variety of time-frequency resources occupied by control information and user data.

A frequency-domain bandwidth of each of the m different frequency-domain resources described above is the first frequency-domain bandwidth, wherein m is an integer less than or equal to n, and greater than 1. Optionally, the sending device occupies a first time-domain resource and the number of m of the different frequency-domain resources in the frequency-division multiplexing manner and repeatedly transmits the control information to the receiving device m times. It is assumed that the first frequency-domain bandwidth occupied by the control information is BW1 and the second frequency-domain bandwidth occupied by the control information is BW2, and BW2 is 3 times of BW1. In the example of FIG. 3, the sending device occupies the first time-domain resource and 2 different frequency-domain resources in the frequency-division multiplexing manner and repeatedly transmits the control information to the receiving device 2 times.

Figure 4:
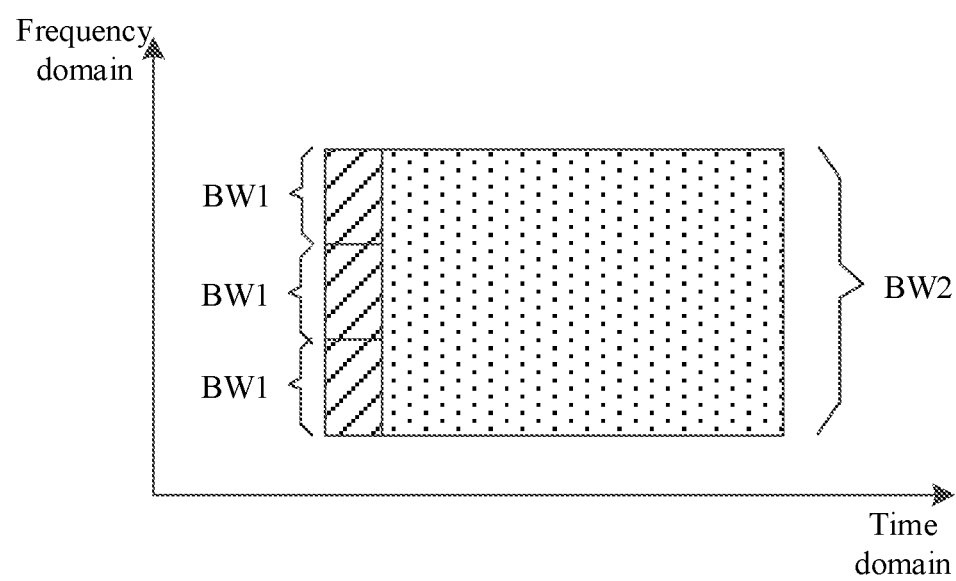
FIG. 4 is a second schematic diagram exemplarily illustrating a variety of time-frequency resources occupied by control information and user data.

Optionally, m may be equal to n and the number of m of the different frequency-domain resources described above do not overlap each other in terms of frequency-domain location, and the sum total of the frequency-domain bandwidths occupied by the number of m of the different frequency-domain resources is equal to the second frequency-domain bandwidth. That is, as shown in FIG. 4, BW2 is 3 times of BW1, and the sending device occupies the first time-domain resource and 3 different frequency-domain resources in the frequency-division multiplexing manner to repeatedly transmit the control information to the receiving device 3 times.

Optionally, in the control information that is repeatedly transmitted m times, the control information uses different transmission powers at least two times; and/or, in the control information that is repeatedly transmitted m times, the control information uses different precoding matrices at least two times. In some possible embodiments, any two of the transmission powers used by the control information repeatedly transmitted m times may be different; and in other possible embodiments, any two of the precoding matrices used by the control information repeatedly transmitted m times may be different.

Figure 5:
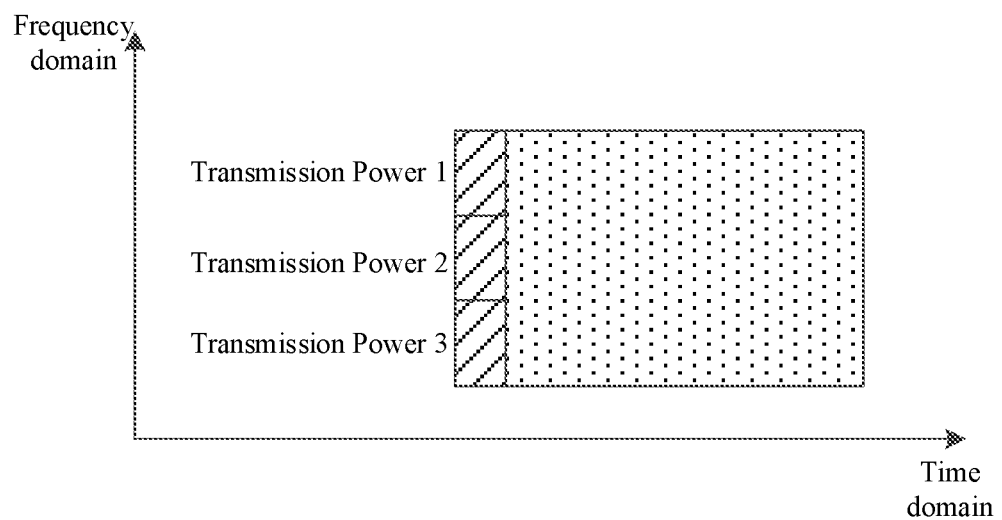
FIG. 5 is a third schematic diagram exemplarily illustrating a variety of time-frequency resources occupied by control information and user data.
Figure 6:
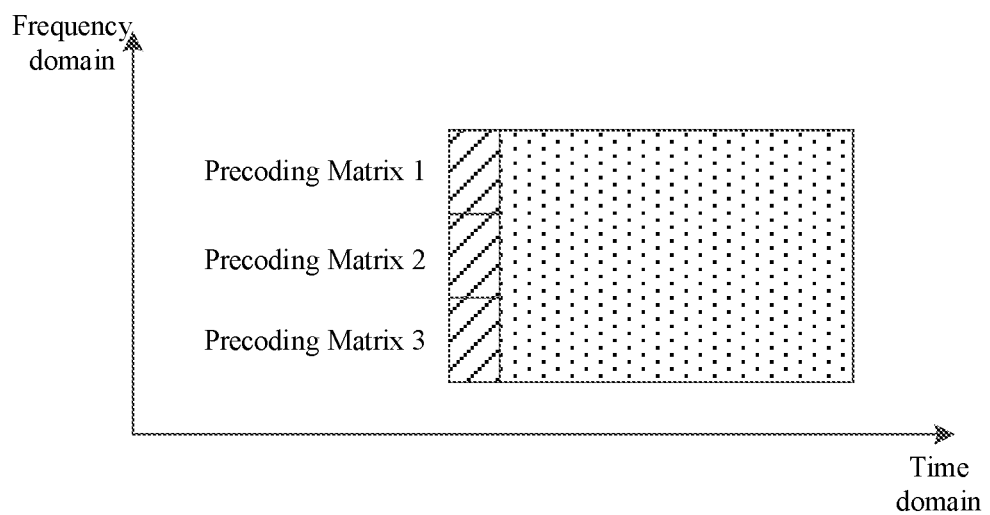
FIG. 6 is a fourth schematic diagram exemplarily illustrating a variety of time-frequency resources occupied by control information and user data.

For example, as shown in FIG. 5, the sending device repeatedly transmits the control information 3 times on 3 different frequency-domain resources using transmission power 1, transmission power 2 and transmission power 3, respectively, and the 3 transmission powers are different from one another. For another example, as shown in FIG. 6, the sending device repeatedly transmits the control information 3 times on 3 different frequency-domain resources using a precoding matrix 1, a precoding matrix 2 and a precoding matrix 3, respectively, and the 3 precoding matrices are different from one another. In the above-described examples of FIGS. 3 to 6, the time-frequency resources occupied by the control information are represented by rectangular boxes filled with slashes, and the time-frequency resources occupied by the user data are represented by rectangular boxes filled with black dots.

If the same transmission power and precoding matrix are used in the control information that is repeatedly transmitted a plurality of times, and if the receiving device is unable to successfully receive information sent by using the transmission power and precoding matrix for some reason, all of the control information that is repeatedly transmitted a plurality of times cannot be successfully received. In the above manner, the control information that is repeatedly transmitted uses different transmission powers and/or precoding matrices, which improves the detection performance of the receiving device and improves the success rate of reception of the control information by the receiving device.

In step 203, the sending device occupies a target frequency-domain resource to send the user data to the receiving device.

In the embodiments of the present disclosure, the frequency-domain bandwidth of the target frequency-domain resource is the second frequency-domain bandwidth and the target frequency-domain resource includes the number of m of the different frequency-domain resources mentioned above. Optionally, the sending device occupies the second time-domain resource and the target frequency-domain resource to send the user data to the receiving device. When the first time-domain resource occupied by the control information and the second time-domain resource occupied by the user data do not overlap each other, the sending device sends the control information and the user data to the receiving device in a manner of TDM.

Sending processes on the sending device side have been described through the above-mentioned steps 201 to 203, and receiving processes on the receiving device side will be described through the following steps 204-206.

In step 204, the receiving device determines a plurality of candidate frequency-domain locations at which the sending device sends the control information.

Before performing the blind detection of the control information, the receiving device that establishes the direct-connection communication with the above-mentioned sending device, at first, determines the plurality of candidate frequency-domain locations at which the sending device sends the control information. The candidate frequency-domain locations refer to frequency-domain locations possibly occupied by the control information. Since the first frequency-domain bandwidth occupied by the control information is a fixed value that is set in advance, the receiving device can determine the plurality of candidate frequency-domain locations at which the sending device sends the control information, based on the first frequency-domain bandwidth. The first frequency-domain bandwidth can be pre-informed to the receiving device by the sending device, or pre-defined by a protocol, or pre-configured by the access network device and informed to the two side devices for the direct-connection communication.

In step 205, the receiving device performs the blind detection of the control information based on the plurality of candidate frequency-domain locations.

According to each candidate frequency-domain location, the receiving device performs the blind detection of the control information at that candidate frequency-domain location. If control information is detected at a candidate frequency-domain location, the control information is decoded and received.

Compared with transmitting the control information only one time by the sending device, in the embodiments of the present disclosure, the sending device occupies a plurality of different frequency-domain resources to repeatedly transmit the control information to the receiving device a plurality of times in the frequency-division multiplexing manner, therefore, when the receiving device performs the blind detection of the control information, the probability that the control information is detected is correspondingly increased, thereby reducing complexity of the blind detection of the control information by the receiving device.

Optionally, the receiving device determines the control information, which is repeatedly transmitted m times, according to information obtained during the blind detection, and then performs merge detection and/or merge reception of the m times of control information. The above-described information may be a demodulation reference signal obtained during the blind detection, for example, when demodulation reference signals of the plurality of pieces of control information have the same sequence or the same or similar signal strength, the receiving device may determine that the plurality of pieces of control information is the same control information that is repeatedly transmitted. For the same control information that is repeatedly transmitted, the receiving device may perform the merge detection and/or the merge reception to improve the effect of detection and reception of the control information.

In step 206, after the control information is successfully received, the receiving device receives the user data on the target frequency-domain resource according to the control information.

The control information carries necessary information required for the reception of user data, for example, the locations of the time-frequency resource blocks occupied by the user data, a modulation coding method of the user data, etc. After the control information is successfully received, the receiving device correctly receives and demodulates the user data according to the contents contained in the control information.

Optionally, if the capability of the receiving device allows, after determining the plurality of candidate frequency-domain locations of the control information, the receiving device may directly perform, the blind detection based on the merge reception, on the control information that is repeatedly transmitted m times, as well, so as to improve the accuracy of the blind detection.

In an example, it is assumed that a system bandwidth in the direct-connection communication between the sending device and the receiving device is 48 physical resource blocks (PRBs), the first frequency-domain bandwidth occupied by the control information is 2 PRBs, every 2 adjacent PRBs are in one group, and the whole system bandwidth is divided into 24 groups of PRBs. In addition, it is assumed that the second frequency-domain bandwidth occupied by the user data is 6 consecutive PRBs, then the sending device can occupy 6 consecutive PRBs (i.e., 3 groups of PRBs) to repeatedly transmit the control information 3 times. In this way, the candidate frequency-domain locations of the control information that is repeatedly transmitted 3 times may be a 1st group of PRBs to a 3rd group of PRBs, a 2nd group of PRBs to a 4th group of PRBs, a 3rd group of PRBs to a 5th group of PRBs, . . . , a 22ed group of PRBs to a 24th group of PRBs, that is, there is a total of 22 kinds of candidate frequency-domain locations. After determining the above-mentioned 22 kinds of candidate frequency-domain locations, the receiving device can detect the presence of the control information at each of the candidate frequency-domain locations, and if the control information is detected at a certain candidate frequency-domain location, the control information that is repeatedly transmitted 3 times at that candidate frequency-domain location is merged and decoded for reception.

In conclusion, compared with transmitting the control information only one time by the sending device, in the technical solutions provided by the embodiments of the present disclosure, the sending device occupies a plurality of different frequency-domain resources to repeatedly transmit the control information to the receiving device a plurality of times in the frequency-division multiplexing manner, therefore, when the receiving device performs the blind detection of the control information, the probability that the control information is detected is correspondingly increased, thereby reducing complexity of the blind detection of the control information by the receiving device.

In addition, since the data amount of the control information is limited, the frequency-domain resources occupied by which are generally less than those of the user data. The resource utilization rate may be improved by occupying a plurality of different frequency-domain resources to repeatedly transmit control information to the receiving device a plurality of times in the frequency-division multiplexing manner.

In addition, since the first frequency-domain bandwidth occupied by the control information is a fixed value set in advance, the frequency-domain location that the control information may occupy is relatively limited, which further facilitates the reduction of complexity of the blind detection of the control information by the receiving device.

It should be noted that, in the above method embodiments, the technical solutions of the present disclosure has been described only from the perspective of the interaction between the sending device and the receiving device. The above-mentioned steps performed by the sending device can be implemented separately as a method for sending information in the direct-connection communication scenario on the sending device side, and the above-mentioned steps performed by the receiving device can be implemented separately as a method for receiving information in the direct-connection communication scenario on the receiving device side.

The following are apparatus embodiments of the present disclosure which may be used to perform the method embodiments of the present disclosure. For details not disclosed in the device embodiments of the present disclosure, please refer to the method embodiment of the present disclosure.

Figure 7:
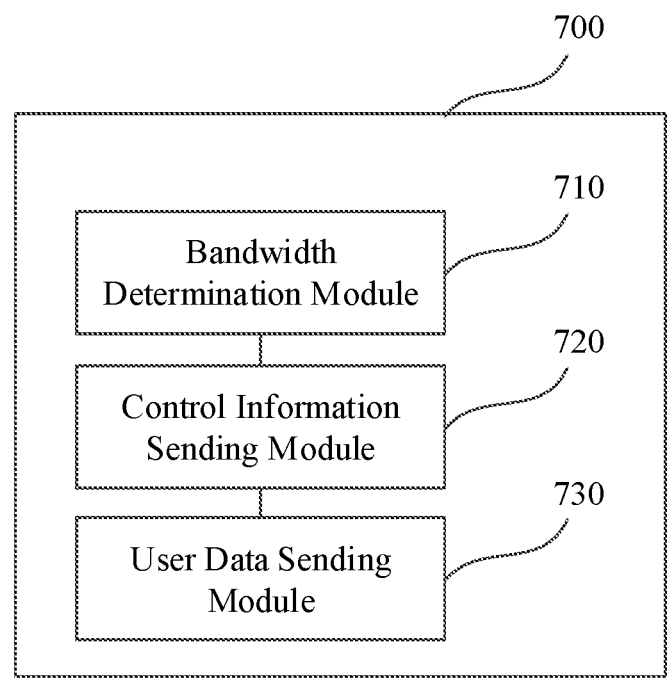
FIG. 7 is a block diagram illustrating an information sending apparatus in a direct-connection communication scenario according to an exemplary embodiment.

FIG. 7 is a block diagram illustrating an information sending apparatus in the direct-connection communication scenario according to an exemplary embodiment. The apparatus has the function to implement method examples on the sending device side described above and the function may be implemented by hardware or by hardware executing corresponding software. The apparatus 700 may include: a bandwidth determination module 710, a control information sending module 720 and a user data sending module 730.

The bandwidth determination module 710 is configured to determine the first frequency-domain bandwidth occupied by the control information to be sent and the second frequency-domain bandwidth occupied by the user data corresponding to the control information, wherein the second frequency-domain bandwidth is n times of the first frequency-domain bandwidth, and n is an integer greater than 1.

The control information sending module 720 is configured to occupy the number of m of the different frequency-domain resources in the frequency-division multiplexing manner to repeatedly transmit the control information to the receiving device m times, wherein the frequency-domain bandwidth of each of the m different frequency-domain resources is the first frequency-domain bandwidth, and m is the integer less than or equal to n, and greater than 1.

The user data sending module 730 is configured to occupy the target frequency-domain resource to send the user data to the receiving device, wherein the frequency-domain bandwidth of the target frequency-domain resource is the second frequency-domain bandwidth, and the target frequency-domain resource includes the number of m of the different frequency-domain resources.

In conclusion, compared with transmitting the control information only one time by the sending device, in the technical solutions provided by the embodiments of the present disclosure, the sending device occupies a plurality of different frequency-domain resources to repeatedly transmit the control information to the receiving device a plurality of times in the frequency-division multiplexing manner, therefore, when the receiving device performs the blind detection of the control information, the probability that the control information is detected is correspondingly increased, thereby reducing complexity of the blind detection of the control information by the receiving device.

In an alternative embodiment provided based on the embodiment of FIG. 7, m is equal to n, the number of m of the different frequency-domain resources do not overlap each other in terms of frequency-domain location and the sum total of the frequency-domain bandwidths occupied by the number of m of the different frequency-domain resources is equal to the second frequency-domain bandwidth.

In another alternative embodiment provided based on the embodiment of FIG. 7, the bandwidth determination module 710 is configured to:
determine the first frequency-domain bandwidth occupied by the control information to be sent;
determine the number of REs that the user data needs occupy according to the data amount and the modulation coding method of the user data corresponding to the control information; and
determine the second frequency-domain bandwidth occupied by the user data according to the number of REs that needs to be occupied by the user data and the first frequency-domain bandwidth, wherein b is the minimum multiple of the number of REs that needs to be occupied to contain the user data, or the multiple closest to the number of REs that needs to be occupied by the user data.

In another alternative embodiment provided based on the embodiment of FIG. 7, in the control information that is repeatedly transmitted m times, the control information uses different transmission powers at least two times.

In another alternative embodiment provided based on the embodiment of FIG. 7, in the control information repeatedly transmitted m times, the control information uses different precoding matrices at least two times.

Figure 8:
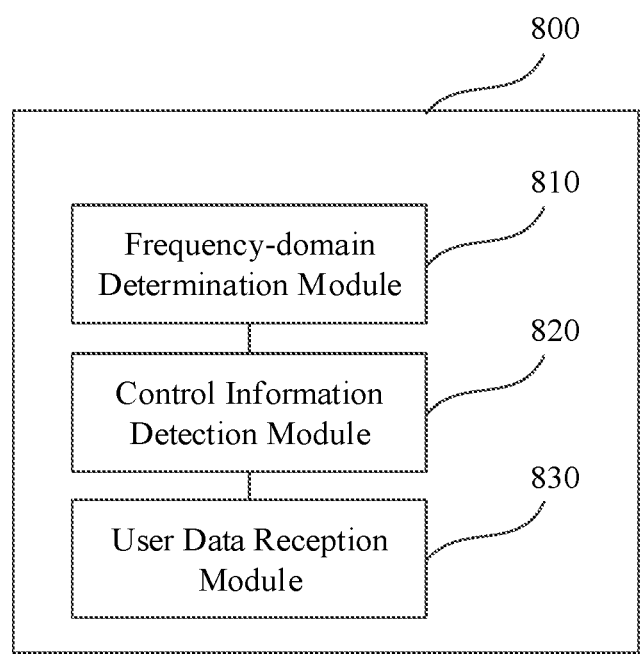
FIG. 8 is a block diagram illustrating an information receiving apparatus in a direct-connection communication scenario according to an exemplary embodiment.

FIG. 8 is a block diagram illustrating an information receiving apparatus in the direct-connection communication scenario according to an exemplary embodiment. The apparatus has the function to implement method examples on the receiving device side described above, and the function may be implemented by hardware or by hardware executing corresponding software. The apparatus 800 may include: a frequency-domain determination module 810, a control information detection module 820 and a user data reception module 830.

The frequency-domain determination module 810 is configured to determine the plurality of candidate frequency-domain locations at which the sending device sends control information, wherein the control information occupies the number of m of the different frequency-domain resources in the frequency-division multiplexing manner for repetitive transmission, the frequency-domain bandwidth of each of the m different frequency-domain resources is the first frequency-domain bandwidth, and m is an integer greater than 1.

The control information detection module 820 is configured to perform the blind detection of the control information according to the plurality of candidate frequency-domain locations.

The user data receiving module 830 is configured to, after the control information is successfully received, receive the user data on the target frequency-domain resource according to the control information, wherein the frequency-domain bandwidth of the target frequency-domain resource is n times of the first frequency-domain bandwidth, and the target frequency-domain resource includes the number of m of frequency-domain resources, n is an integer greater than 1, m is less than or equal to n.

In conclusion, compared with transmitting the control information only one time by the sending device, in the technical solutions provided by the embodiments of the present disclosure, the sending device occupies a plurality of different frequency-domain resources to repeatedly transmit the control information to the receiving device a plurality of times in the frequency-division multiplexing manner, therefore, when the receiving device performs the blind detection of the control information, the probability that the control information is detected is correspondingly increased, thereby reducing complexity of the blind detection of the control information by the receiving device.

In an alternative embodiment provided based on the embodiment of FIG. 8, m may be equal to n, the number of m of the different frequency-domain resources do not overlap each other in terms of frequency-domain location, and the sum total of the frequency-domain bandwidths occupied by the number of m of the different frequency-domain resources is equal to the second frequency-domain bandwidth.

In an alternative embodiment provided based on the embodiment of FIG. 8, the apparatus 800 further includes: a retransmission determination module (not shown in the figures).

The retransmission determination module is configured to determine the control information, which is repeatedly transmitted m times, according to information obtained during the blind detection.

The control information detection module 820 is further configured to perform the merge detection and/or the merge reception of the m times of control information.

In an alternative embodiment provided based on the embodiment of FIG. 8, the control information detection module 820 is configured to perform the blind detection based on the merge reception on the control information, which is repeatedly transmitted m times, according to the plurality of candidate frequency-domain locations.

It should be noted that, when the apparatus provided by the above embodiments realizes the function thereof, it is only illustrated by taking the division manner of the above functional modules as examples. In practical application, the above functions may be assigned to different functional modules as desired, that is, the internal structure of the apparatus may be divided into different functional modules to accomplish all or a part of the functions described above.

With respect to the apparatuses in the above embodiments, the specific manners for performing operations by the respective modules therein have been described in detail in the embodiments regarding the methods, which will not be elaborated herein.

An exemplary embodiment of the present disclosure further provides an information sending apparatus in the direct-connection communication scenario, which is capable of implementing the method of sending information in the direct-connection communication scenario, provided by the present disclosure. The apparatus may be the sending device as described above, or may be provided in a sending device. The apparatus includes: a processor and a memory for storing instructions executable by the processor, wherein the processor is configured to:

determine the first frequency-domain bandwidth occupied by the control information to be sent and the second frequency-domain bandwidth occupied by the user data corresponding to the control information, wherein the second frequency-domain bandwidth is n times of the first frequency-domain bandwidth, and n is an integer greater than 1;

occupy the number of m of the different frequency-domain resources in the frequency-division multiplexing manner to repeatedly transmit the control information to the receiving device m times, wherein the frequency-domain bandwidth of each of the m different frequency-domain resources is the first frequency-domain bandwidth, m is an integer less than or equal to n, and greater than 1; and occupy the target frequency-domain resource to transmit the user data to the receiving device, wherein the frequency-domain bandwidth of the target frequency-domain resource is the second frequency-domain bandwidth, and the target frequency-domain resource includes the number of m of the different frequency-domain resources.

Optionally, m is equal to n, the number of m of the different frequency-domain resources do not overlap each other in terms of frequency-domain location, and the sum total of the frequency-domain bandwidths occupied by the number of m of the different frequency-domain resources is equal to the second frequency-domain bandwidth.

Optionally, the processor is configured to:
determine the first frequency-domain bandwidth occupied by the control information to be sent;
determine the number of REs that needs to be occupied by the user data according to the data amount and the modulation coding method of the user data corresponding to the control information;
determine the second frequency-domain bandwidth occupied by the user data according to the number of REs that needs to be occupied by the user data and the first frequency-domain bandwidth, wherein n is the minimum multiple of the number of REs that needs to be occupied to contain the user data or the multiple closest to the number of REs that needs to be occupied by the user data.

Optionally, in the control information that is repeatedly transmitted m times, the control information uses different transmission powers at least two times.

Optionally, in the control information that is repeatedly transmitted m times, the control information uses different precoding matrices at least two times.

An exemplary embodiment of the present disclosure further provides an information receiving device in the direct-connection communication scenario, which is capable of implementing the method of receiving information in the direct-connection communication scenario, provided by the present disclosure. The apparatus may be the receiving device as described above, or may be provided in a receiving device. The apparatus includes: a processor and a memory for storing instructions executable by the processor, wherein the processor is configured to:

determine the plurality of candidate frequency-domain locations at which the sending device sends control information, wherein the control information occupies the number of m of the different frequency-domain resources in the frequency-division multiplexing manner for repetitive transmission, and the frequency-domain bandwidth of each of the m different frequency-domain resources is the first frequency-domain bandwidth, and m is an integer greater than 1;

perform the blind detection of the control information according to the plurality of candidate frequency-domain locations; and after the control information is successfully received, receive the user data on the target frequency-domain resource according to the control information, wherein the frequency-domain bandwidth of the target frequency-domain resource is n times of the first frequency-domain bandwidth, the target frequency-domain resource includes the number of m of frequency-domain resources, n is an integer greater than 1, and m is less than or equal to n.

Optionally, m is equal to n, the number of m of the different frequency-domain resources do not overlap each other in terms of frequency-domain location, and the sum total of the frequency-domain bandwidths occupied by the number of m of the different frequency-domain resources is equal to the second frequency-domain bandwidth.

Optionally, the processor is further configured to:
determine the control information, which is repeatedly transmitted m times, according to information obtained during the blind detection;

perform the merge detection and/or the merge reception of the m times of control information.

Optionally, the processor is further configured to:

perform, the blind detection based on the merge reception, on the control information that is repeatedly transmitted m times, according to the plurality of candidate frequency-domain locations.

The solutions provided by the embodiments of the present disclosure have been described above mainly from the perspective of the interaction between the sending device and the receiving device. It should be understood that, in order to achieve the above-mentioned functions, the apparatuses (including the sending device and the receiving device) include corresponding hardware structures and/or software modules that carry out respective functions. In conjunction with units and algorithm steps of the examples described in the embodiments in the present disclosure, the embodiments of the present disclosure can be implemented by hardware or the combination of hardware and computer software. Whether a particular function is performed by hardware or by computer software driving hardware depends on the particular application and design constraint conditions of the technical solutions. A person skilled in the art may use different approaches for each particular application to implement the described function, but such implementation should not be considered as going beyond the scope of the technical solutions of the embodiments of the present disclosure.

Figure 9:
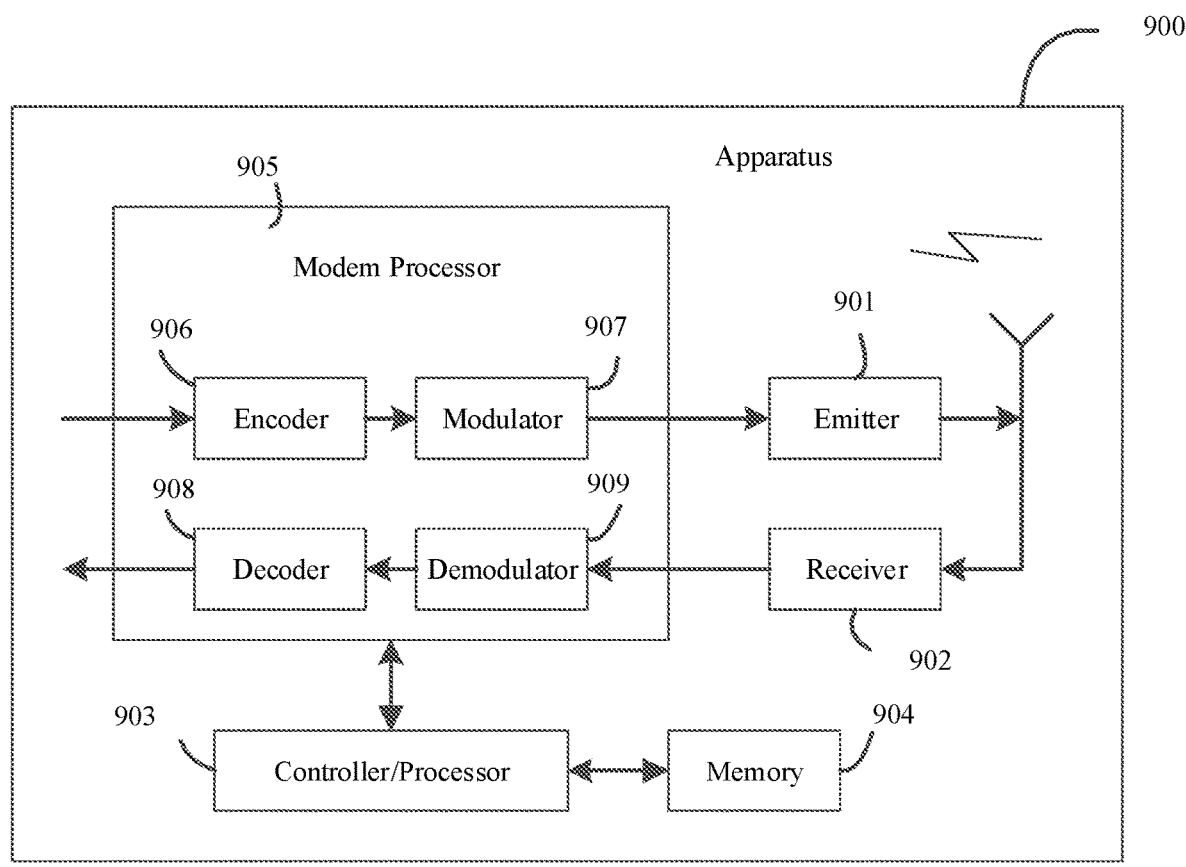
FIG. 9 is a structural schematic diagram illustrating an apparatus in a direct-connection communication scenario according to an exemplary embodiment.

FIG. 9 is a structural schematic diagram illustrating an apparatus 900 in the direct-connection communication scenario according to an exemplary embodiment. The apparatus 900 may be an apparatus that performs the direct-connection communication with other devices in the V2X service scenario, for example, an electronic device such as the in-vehicle device, the terminal, etc. The apparatus 900 may be the sending device or the receiving device as described above.

The apparatus 900 includes an emitter 901, a receiver 902 and a processor 903, wherein, the processor 903 may be a controller as well, and is denoted as "controller/processor 903" in FIG. 9. Optionally, the apparatus 900 may further include a modem processor 905, wherein the modem processor 905 may include an encoder 906, a modulator 907, a decoder 908 and a demodulator 909.

In one example, the emitter 901 regulates (for example, performs analog conversion, filtering, amplification, up-conversion, etc.) the output sampling and generates an uplink signal, and the uplink signal is emitted to an access network device via an antenna. On a downlink, the antenna receives a downlink signal emitted by the access network device. The receiver 902 regulates (for example, performs filtration, amplification, down-conversion, digitization, etc.) the signal received from the antenna and provides input sampling. In the modem processor 905, the encoder 906 receives service data and signaling messages to be sent on the uplink and processes (for example, formats, encodes, and interleaves) the service data and signaling messages. The modulator 907 further processes (e.g., symbol mapping and modulation) the encoded service data and signaling messages and provides the output sampling. The demodulator 909 processes (for example, demodulates) the input sampling and provides symbol estimation. The decoder 908 processes (for example, deinterleaves and decodes) the symbol estimation and provides, the decoded data and signaling messages to be sent, to the apparatus 900. The encoder 906, the modulator 907, the demodulator 909 and the decoder 908 may be implemented by a synthetized modem processor 905. These units process according to the wireless access technology adopted in the wireless access network (e.g., access technology for LTE and other evolution systems). It should be noted that, when the apparatus 900 does not include the modem processor 905, the above functions of the modem processor 905 may be accomplished by the processor 903 as well.

The processor 903 controls and manages the actions of the apparatus 900 for performing the processes performed by the apparatus 900 in the above-described embodiments of the present disclosure. For example, the processor 903 is further used to perform the respective steps of the sending device or receiving device in the method embodiments described above, and/or other steps of the technical solutions described in the embodiments of the present disclosure.

Further, the apparatus 900 may also include a memory 904, which is configured to store program codes and data for use in the apparatus 900.

It will be appreciated that FIG. 9 illustrates only a simplified design of the apparatus 900. In practical application, the apparatus 900 may include any number of emitters, receivers, processors, modem processors, memories, etc., and all devices that can implement the embodiments of the present disclosure are within the protection scope of the embodiments of the present disclosure.

Embodiments of the present disclosure further provide a non-transitory computer readable storage medium having computer programs stored thereon, that, when executed by a processor of the apparatus 900, implement the method for sending information in the direct-connection communication scenario as described above, or implement the method of receiving information in the direct-connection communication scenario as described above.

It should be understood that "a plurality of" mentioned herein means two or more. Term "and/or" describes an association relationship of associated objects, and represents that there may be three kinds of relationships, for example, A and/or B, may mean the presence of A alone, the presence of both A and B, and the presence of B alone. The character "/" generally indicates that the relationship between the associated foregoing one and following one is an "or" relationship.

Other embodiments of the disclosure will be apparent to those skilled in the art from consideration of the specification and practice of the invention disclosed here. This application is intended to cover any variations, uses, or adaptations of the disclosure following the general principles thereof and including such departures from the present disclosure as come within known or customary practice in the art. It is intended that the specification and examples be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the present disclosure only be limited by the appended claims.

What is claimed is:

1. A method for sending information in a direct-connection communication scenario, comprising:
   determining, by a sending device, a first frequency-domain bandwidth occupied by control information to be sent and a second frequency-domain bandwidth occupied by user data corresponding to the control information, wherein the second frequency-domain bandwidth is n times of the first frequency-domain bandwidth, and n is an integer greater than 1;

occupying, by the sending device, a number of m of different frequency-domain resources in a frequency-division multiplexing manner to repeatedly transmit the control information to a receiving device m times, wherein a frequency-domain bandwidth of each of the m different frequency-domain resources is the first frequency-domain bandwidth, and m is an integer less than or equal to n, and greater than 1; and occupying, by the sending device, a target frequency-domain resource to send the user data to the receiving device, wherein a frequency-domain bandwidth of the target frequency-domain resource is the second frequency-domain bandwidth, and the target frequency-domain resource comprises the m different frequency-domain resources;

wherein n is a minimum multiple of a number of resource elements (REs) that needs to be occupied to contain the user data or a multiple closest to the number of REs that ne pied by the user data.

2. The method according to claim 1, wherein m is equal to n, the m different frequency-domain resources do not overlap each other in terms of frequency-domain location, and a sum total of the frequency-domain bandwidths occupied by the m different frequency-domain resources is equal to the second frequency-domain bandwidth.

3. A non-transitory computer readable storage medium, having computer program stored thereon, wherein the computer program, when executed by a processor, implements steps of the method according to claim 2.

4. The method according to claim 1, wherein said determining, by the sending device, the first frequency-domain bandwidth occupied by the control information to be sent and the second frequency-domain bandwidth occupied by the user data corresponding to the control information, comprises:

determining, by the sending device, the first frequency-domain bandwidth occupied by the control information to be sent;

determining, by the sending device, the number of REs that needs to be occupied by the user data, according to data amount and a modulation coding method of the user data corresponding to the control information; and determining, by the sending device, the second frequency-domain bandwidth occupied by the user data, according to the number of REs that needs to be occupied by the user data and the first frequency-domain bandwidth.

5. The method according to claim 1, wherein in the control information that is repeatedly transmitted m times, the control information uses different transmission powers at least two times.

6. The method according to claim 1, wherein in the control information that is repeatedly transmitted m times, the control information uses different precoding matrices at least two times.

7. A non-transitory computer readable storage medium, having computer program stored thereon, wherein the computer program, when executed by a processor, implements the steps of the method according to claim 1.

8. A method for receiving information in a direct-connection communication scenario, comprising:

determining, by a receiving device, a plurality of candidate frequency-domain locations at which a sending device sends control information, wherein the control information occupies a number of m of different frequency-domain resources in a frequency-division multiplexing manner for repetitive transmission, a frequency-domain bandwidth of each of the m different frequency-domain resources is a first frequency-domain bandwidth, and m is an integer greater than 1;

performing, by the receiving device, blind detection of the control information, according to the plurality of candidate frequency-domain locations; and receiving, after the control information is successfully received, by the receiving device, the user data on a target frequency-domain resource, according to the control information, wherein a frequency-domain bandwidth of the target frequency-domain resource is n times of the first frequency-domain bandwidth, the target frequency-domain resource comprises the m frequency-domain resources, n is an integer greater than 1, and m is less than or equal to n;

wherein n is a minimum multiple of a number of resource elements (REs) that needs to be occupied to contain the user data or a multiple closest to the number of REs that needs to be occupied by the user data.

9. The method according to claim 8, wherein m is equal to n, the m different frequency-domain resources do not overlap each other in terms of frequency-domain location, and a sum total of the frequency-domain bandwidths occupied by the m different frequency-domain resources is equal to the second frequency-domain bandwidth.

10. A non-transitory computer readable storage medium, having computer program stored thereon, wherein the computer program, when executed by a processor, implements steps of the method according to claim 9.

11. The method according to claim 8, further comprising:

determining, by the receiving device, the control information, which is repeatedly transmitted m times, according to information obtained during the blind detection; and performing, by the receiving device, merge detection and/or merge reception of the m times of control information.

12. The method according to claim 8, wherein said performing, by the receiving device, the blind detection of the control information, according to the plurality of candidate frequency-domain locations, comprises:

performing, by the receiving device, the blind detection based on merge reception, on the control information that is repeatedly transmitted m times, according to the plurality of candidate frequency-domain locations.

13. A non-transitory computer readable storage medium, having computer program stored thereon, wherein the computer program, when executed by a processor, implements steps of the method according to claim 8.

14. An apparatus for sending information in a direct-connection communication scenario, comprising:

a processor;

a memory for storing instructions executable by the processor, wherein the processor is configured to:

determine a first frequency-domain bandwidth occupied by control information to be sent and a second frequency-domain bandwidth occupied by user data corresponding to the control information, wherein the second frequency-domain bandwidth is n times of the first frequency-domain bandwidth, and n is an integer greater than 1;

occupy a number of m of different frequency-domain resources in a frequency-division multiplexing manner to repeatedly transmit the control information to a receiving device m times, wherein a frequency-domain bandwidth of each of the m different frequency-domain resources is the first frequency-domain bandwidth, and m is an integer less than or equal to n, and greater than 1; and occupy a target frequency-domain resource to send the user data to the receiving device, wherein a frequency-domain bandwidth of the target frequency-domain resource is the second frequency-domain bandwidth, and the target frequency-domain resource comprises the m different frequency-domain resources;

wherein n is a minimum multiple of a number of resource elements (REs) that needs to be occupied to contain the user data or a multiple closest to the number of REs that needs to be occupied by the user data.

15. The apparatus according to claim 14, wherein m is equal to n, the m different frequency-domain resources do not overlap each other in terms of frequency-domain location, and a sum total of the frequency-domain bandwidths occupied by the m different frequency-domain resources is equal to the second frequency-domain bandwidth.

16. The apparatus according to claim 14, wherein the processor is further configured to:

determine the first frequency-domain bandwidth occupied by the control information to be sent;

determine a number of resource elements (REs) that needs to be occupied by the user data, according to data amount and a modulation coding method of the user data corresponding to the control information; and determine the second frequency-domain bandwidth occupied by the user data according to the number of REs that needs to be occupied by the user data and the first frequency-domain bandwidth, wherein n is a minimum multiple of the number of REs that needs to be occupied to contain the user data or a multiple closest to the number of REs that needs to be occupied by the user data.

17. The apparatus according to claim 14, wherein in the control information that is repeatedly transmitted m times, the control information uses different transmission powers at least two times.

18. The apparatus according to claim 14, wherein in the control information that is repeatedly transmitted m times, the control information uses different precoding matrices at least two times.

19. A communication system implementing the method according to claim 1, comprising the sending device, wherein the sending device is configured to occupy a plurality of different frequency-domain resources to repeatedly transmit the control information to the receiving device a plurality of times in a frequency-division multiplexing manner, such, when the receiving device performs blind detection of the control information, a probability that the control information is detected is correspondingly increased, thereby reducing complexity of blind detection of the control information by the receiving device.

20. The communication system according to claim 19, further comprising the receiving device, wherein the receiving device is configured to:

determine the plurality of candidate frequency-domain locations at which the sending device sends control information;

perform blind detection of the control information, according to the plurality of candidate frequency-domain locations; and receive, after the control information is successfully received, the user data on the target frequency-domain resource, according to the control information.

* * * * *